US011072110B2

(12) United States Patent
Hikmet et al.

(10) Patent No.: US 11,072,110 B2
(45) Date of Patent: Jul. 27, 2021

(54) 3D PRINTING OF OBJECTS WITH OPTICAL FUNCTIONAL SURFACES

(71) Applicant: SIGNIFY HOLDING B.V., Eindhoven (NL)

(72) Inventors: Rifat Ata Mustafa Hikmet, Eindhoven (NL); Coen Theodorus Hubertus Fransiscus Liedenbaum, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/773,185

(22) PCT Filed: Nov. 7, 2016

(86) PCT No.: PCT/EP2016/076831
§ 371 (c)(1),
(2) Date: May 3, 2018

(87) PCT Pub. No.: WO2017/080951
PCT Pub. Date: May 18, 2017

(65) Prior Publication Data
US 2018/0319076 A1    Nov. 8, 2018

(30) Foreign Application Priority Data

Nov. 9, 2015   (EP) ..................................... 15193623

(51) Int. Cl.
*B05D 5/06*    (2006.01)
*B29D 11/00*   (2006.01)
(Continued)

(52) U.S. Cl.
CPC ............ *B29C 64/118* (2017.08); *B05D 5/063* (2013.01); *B29D 11/0073* (2013.01);
(Continued)

(58) Field of Classification Search
CPC ........ B05D 5/06; B05D 5/063; B29C 64/106; B29C 64/112; B29C 64/118; B29D 11/00;
(Continued)

(56) References Cited

U.S. PATENT DOCUMENTS

2009/0086494 A1*  4/2009 Kenney ..................... F21V 1/14
                                                           362/356
2012/0231225 A1    9/2012 Mikulak et al.
(Continued)

FOREIGN PATENT DOCUMENTS

CN    104015358 A    9/2014
CN    104890248 A    9/2015
(Continued)

OTHER PUBLICATIONS

[NPL-1] Anonymous, "Lennovation's Hub: XP002756684"; Apr. 2015; <https://www.3dhubs.com/malm%C3%B6/hubs/lennovation>. (Year: 2015).*
(Continued)

*Primary Examiner* — Leo B Tentoni

(57) ABSTRACT

A method for 3D printing an object with at least one wall (2) having a first surface and a second, opposite surface, wherein the first surface is intended to serve as an optical functional surface, wherein the wall is formed by printing one track (16) on top of another track (17). An orientation of the object during printing is selected such that the wall has a tangent (or tangent surface) non-parallel to the z-axis, such that the first surface faces away from the x-y plane and the second surface faces the x-y plane. According to the invention, the 3D object is thus oriented during printing such that the first surface, intended to be used as an optical functional surface, faces away from the x-y plane, i.e. typically away from the support or platform on which the 3D object is printed upon. By ensuring this orientation during printing,
(Continued)

the first surface becomes smoother than the second, opposite surface of the wall.

11 Claims, 4 Drawing Sheets

(51) Int. Cl.
*B29C 64/118* (2017.01)
*B33Y 10/00* (2015.01)
*B33Y 40/00* (2020.01)
*G01S 5/16* (2006.01)
*B33Y 80/00* (2015.01)
*F21V 1/26* (2006.01)
*F21V 7/04* (2006.01)
*B29L 31/00* (2006.01)
*B29L 11/00* (2006.01)

(52) U.S. Cl.
CPC .......... *B29D 11/0074* (2013.01); *B33Y 10/00* (2014.12); *B33Y 40/00* (2014.12); *B33Y 80/00* (2014.12); *F21V 1/26* (2013.01); *F21V 7/048* (2013.01); *G01S 5/16* (2013.01); *B29L 2011/00* (2013.01); *B29L 2011/0083* (2013.01); *B29L 2031/747* (2013.01); *B29L 2031/7472* (2013.01)

(58) Field of Classification Search
CPC ............ B29D 11/0073; B29D 11/0074; B29L 2011/00; B29L 2011/0083; B29L 2031/747; B29L 2031/7472; F21V 1/26
USPC .............................. 264/1.1, 1.7, 1.9, 129, 308
See application file for complete search history.

(56) References Cited

U.S. PATENT DOCUMENTS

| 2013/0009338 | A1* | 1/2013 | Mayer .................. B29C 64/118 264/241 |
| 2013/0189435 | A1 | 7/2013 | Mackie et al. |
| 2014/0070445 | A1 | 3/2014 | Mayer |
| 2014/0277661 | A1 | 9/2014 | Amadio et al. |
| 2015/0079327 | A1* | 3/2015 | Kautz .................. B29C 64/106 264/308 X |
| 2015/0367571 | A1* | 12/2015 | Kanada ................ B29C 64/118 264/211.12 |
| 2015/0375457 | A1* | 12/2015 | Mark .................. B29C 67/0088 425/166 |
| 2016/0289468 | A1* | 10/2016 | Turner .................. B29C 64/118 |

FOREIGN PATENT DOCUMENTS

| CN | 204686014 U | 10/2015 | |
| CN | 105643925 A | 6/2016 | |
| WO | WO-2014194959 A1 * | 12/2014 | ............. B29D 11/00 |
| WO | 2016033286 A1 | 3/2016 | |

OTHER PUBLICATIONS

Anonymous, "Lennovation's Hub", 3D Hubs, Apr. 2015, pp. 1-7.
Anonymous, "3D Light Shades; zwart-goud", Bamboo Grove, 2014, pp. 1-7.
John Klein, "Additive Manufacturing of Optically Transparent Glass," Massachusetts Institute of Technology, Program in Media Arts and Sciences, School of Architecture and Planning, 2015 (96 Pages).
Erwin Schuster, "3D Printed Light Shades. Black-Gold," Monthly Archives: Dec. 2014, www.bamboo-groove.com/2014/12/ (5 Pages).

* cited by examiner

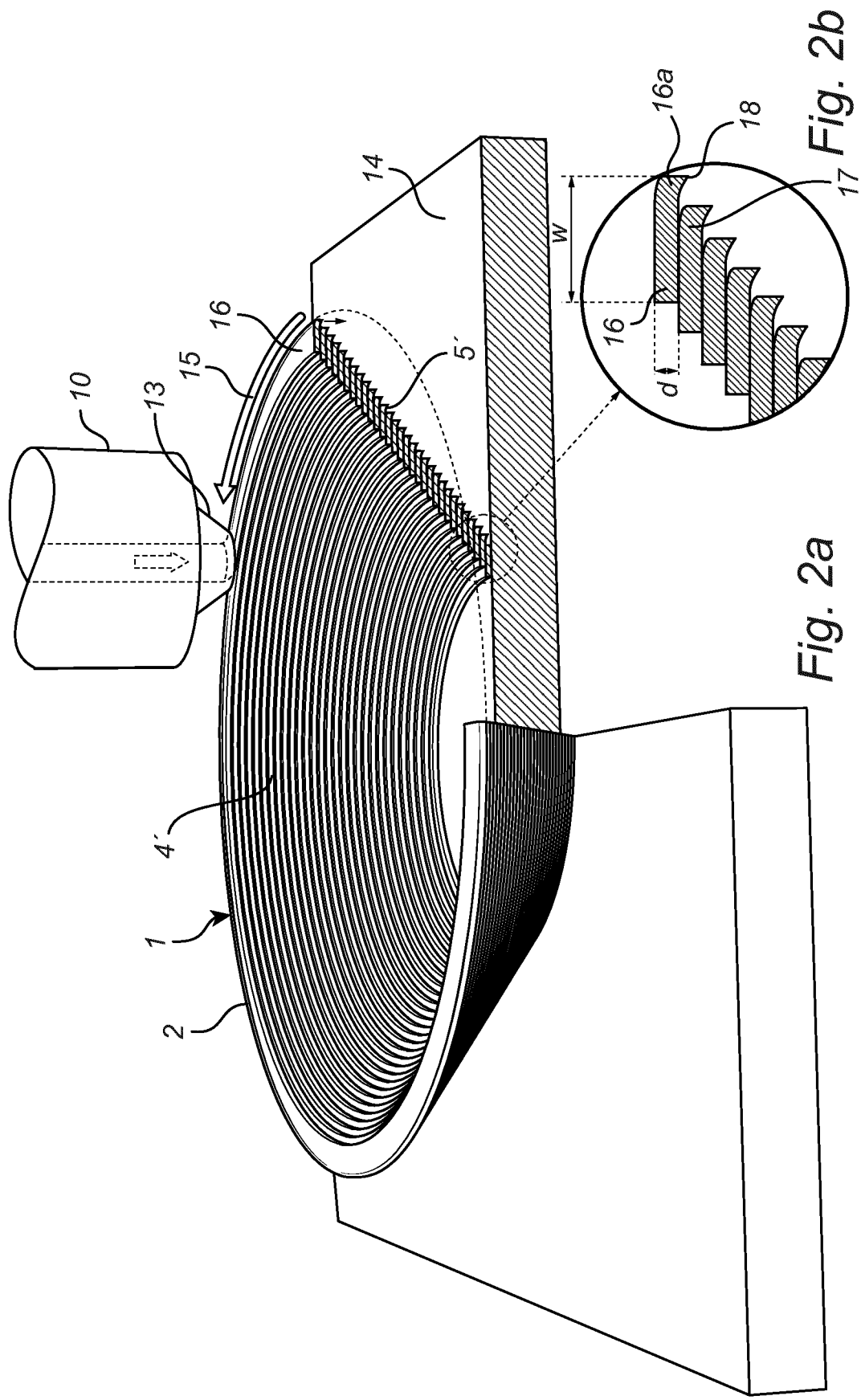

3D PRINTING OF OBJECTS WITH OPTICAL FUNCTIONAL SURFACES

CROSS-REFERENCE TO PRIOR APPLICATIONS

This application is the U.S. National Phase application under 35 U.S.C. § 371 of International Application No. PCT/EP2016/076831, filed on Nov. 7, 2016, which claims the benefit of European Patent Application No. 15193623.4, filed on Nov. 9, 2015. These applications are hereby incorporated by reference herein.

FIELD OF THE INVENTION

The present invention relates to 3D printing of objects with at least one wall having a first surface and a second, opposite surface, wherein said first surface is intended to serve as an optical functional surface.

BACKGROUND OF THE INVENTION

Digital fabrication has begun to transform the nature of global manufacturing. One of the aspects of digital fabrication is 3D printing. Currently many different techniques have been developed in order to produce various 3D printed objects using various materials such as ceramics, metals and polymers. 3D printing can also be used in producing molds which can then be used for replicating objects. For this purpose the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used is the process known as Fused Deposition Modeling (FDM). FDM printers use a thermoplastic filament, which is heated to its melting point and then extruded, layer by layer, to create a three dimensional object. FDM printers are relatively fast and can be used for printing complicated object.

FDM is also an ideal printing process especially when printing conical hemispherical or faceted objects which are used in lighting.

US20140070445A1 describes a method for FDM to produce an object and various ways of varying a deposit rate of the build material during the extrusion onto an exterior wall of the object to create a non-uniform surface texture on the exterior wall. For this purpose they suggest varying the extrusion rate, distance in a direction during extrusion, and varying the velocity in x-y direction.

SUMMARY OF THE INVENTION

It is an object of the present invention to overcome this problem, and to provide a less complex way to achieve a 3D printed surface suitable for use as an optical functional surface.

According to a first aspect of the invention, this and other objects are achieved by a method for 3D printing an object with at least one wall having a first surface and a second, opposite surface, wherein the first surface is intended to serve as an optical functional surface, the method comprising:

moving a printing head along a predefined path in an x-y plane, extruding a track of printing material from a nozzle of the printing head during movement of the printing head along the predefined path, to print one layer of the object, printing consecutive layers onto each other, thereby forming the wall by printing one track on top of another track, selecting an orientation of the object during printing by defining the predefined path of each layer such that at least a portion of the wall has a tangent (or tangent surface) non-parallel to the z-axis, such that the first surface in the portion faces away from the x-y plane and the second surface in the portion faces the x-y plane, and wherein a surface smoothness of the first surface the portion is greater than a surface smoothness of the second surface in the portion.

According to the invention, the 3D object is thus oriented during printing such that the first surface, intended to be used as an optical functional surface, faces away from the x-y plane, i.e. typically away from the support or platform on which the 3D object is printed upon. By ensuring this orientation during printing, the first surface becomes smoother than the second, opposite surface of the wall.

The present invention is based on the insight that when a non solid object including a wall formed by consecutive layers of printing material, the surface properties of this wall will depend on the orientation of the object during printing. If the wall is vertical (e.g. a vertical cylinder), the inside and outside surfaces of the wall will have the same roughness. However, when the wall is inclined with respect to the x-y plane, such as a tilted cylinder or a conical object, any surface facing the platform is rougher than the opposite surface facing away from the platform. The inventors have realized that by controlling the orientation of an object during printing, the surface quality of selected portions of the printed object can be controlled. In particular, an optical functional surface, e.g. a surface used for collimation of light or esthetics, may be oriented so that it is printed more smoothly than the opposite surface of the wall.

The wall which is formed by consecutive tracks of printed material will have a width (in the x-y plane) defined by the diameter of the nozzle. Typically, this will thus be a relatively thin wall. Still, the width of the track (and the wall) is preferably greater than the thickness of each layer, in order to achieve the desired smoothness. According to a preferred embodiment, a ratio of the nozzle diameter and the thickness of the printed layer is greater than three, or even greater than five.

Several different 3D objects may present walls with surfaces that are possible to orient such that one surface of the wall is smoother than the other surface. However, the invention is particularly useful when the wall forms a contour surrounding a hollow interior. Specific examples of such shapes are cylinders (tilted with respect to the x-y plane), (truncated) cones, (truncated) pyramids, half-spheres etc. The shapes may be rotational symmetrical, but this is not necessary.

Alternatively, however, the wall may simply be a small part of a more complex object. The only condition in order to make the invention relevant is that the wall is formed by a plurality of tracks printed onto each other.

The difference in surface smoothness between the first and second surfaces will be a function also on the inclination of the wall or portion of the wall with respect to the x-y plane. When the wall is perpendicular to the surface or makes a small angle (less than 0-5 degrees) with respect to the normal (z-axis) there is not much difference in the quality of the inner and outer surfaces. In some embodiments of the invention, the angle between the tangent (or tangent surface) of the first surface and the normal (z-axis) is in the range 5-45 degrees, and preferably in the range 5-35 degrees.

In some application, the smoothness obtained by ensuring the correct orientation during printing according to the present invention is sufficient. However, in other applications, the functional surface will be coated in order to obtain the desired properties. In this case, the smoother surface obtained by the present invention will be highly advantageous for such coating.

It is noted that the invention relates to all possible combinations of features recited in the claims.

BRIEF DESCRIPTION OF THE DRAWINGS

This and other aspects of the present invention will now be described in more detail, with reference to the appended drawings showing currently preferred embodiment(s) of the invention.

FIG. 2a shows an enlarged and partly cut away perspective view of the FDM printing in FIG. 1b.

FIG. 2b is an enlarged detail of FIG. 2a.

DETAILED DESCRIPTION

Currently preferred embodiments of the present invention will now be described in more detail, with reference to the accompanying drawings. The invention may, however, be embodied in many different forms and should not be construed as limited to the embodiments set forth herein; rather, these embodiments are provided for thoroughness and completeness, and fully convey the scope of the invention to the skilled person.

Figure 1A:
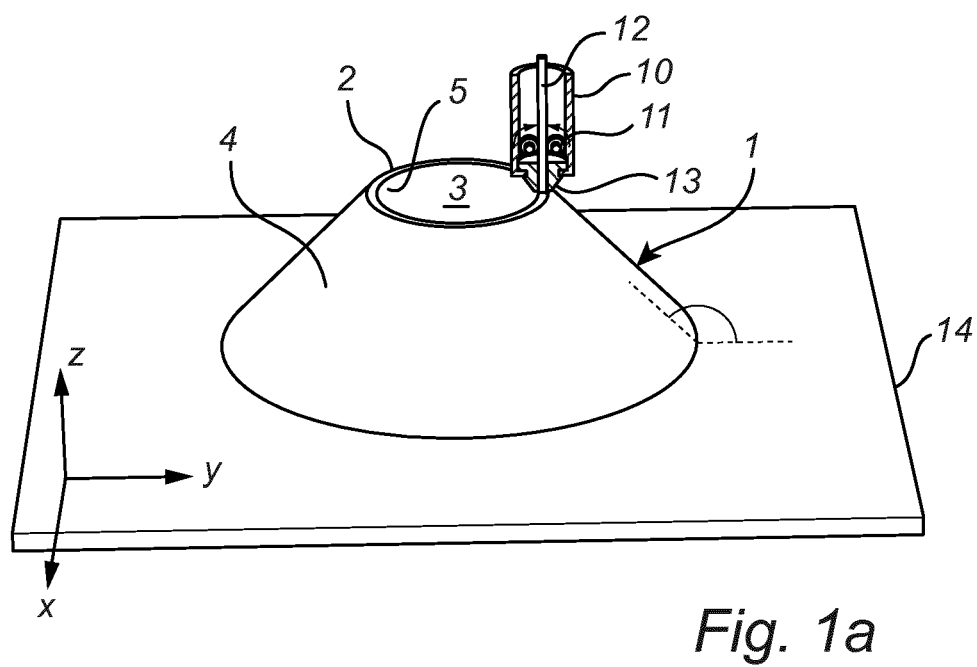
FIGS. 1a and 1b schematically illustrate FDM printing of a conical object in two different orientations.
Figure 1B:
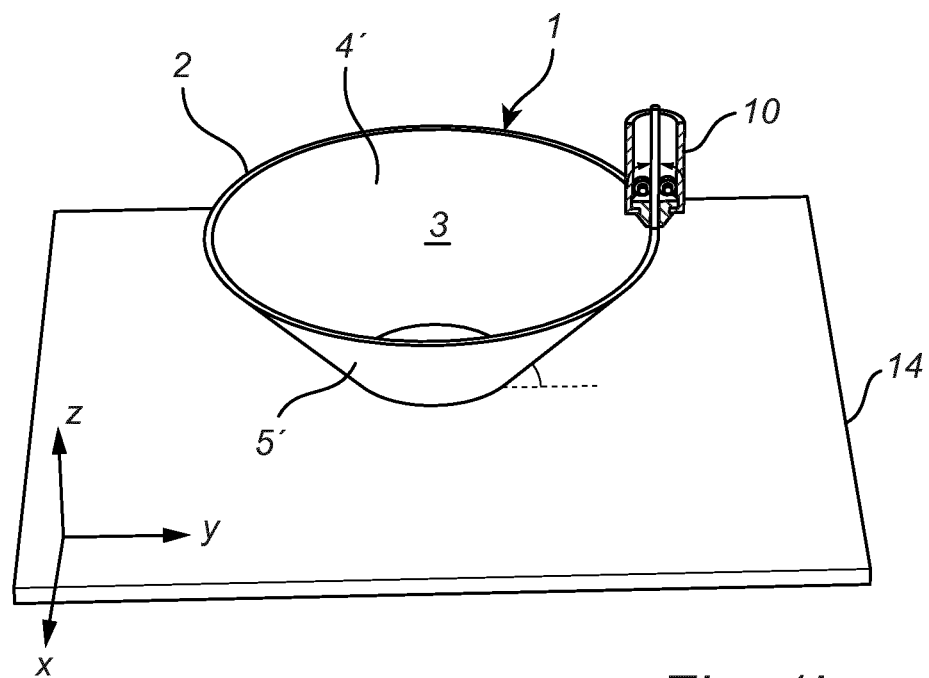

FIGS. 1a and 1b show FDM printing of an object 1, in the illustrated case in the shape of a cone. FDM printing is well known in the art, and will not be described in detail here. For the purpose of this disclosure, it is sufficient to say that an FDM printer has a printing head 10 including a feeder 11 for feeding a filament 12 of thermoplastic material through a channel in a nozzle 13. Immediately upstream of the nozzle is provided a heater (not shown) configured to heat the filament to its melting point, such that the thermoplastic is extruded and deposited by the nozzle in melted form. The printing head 10 is arranged to be moved in an x-y plane while depositing the melted thermoplastic to print one layer of the object. As consecutive layers are printed on top of each other, the object is built layer by layer in the z-direction. The object is typically printed on some kind of support or substrate 14. The object 1 has a wall 2, here a contour wall surrounding a hollow interior 3. The interior may be closed in its top and/or bottom end, but may also be open. The wall 2 has a first surface 4, 4' facing away from the substrate, and a second surface 5, 5' facing towards the substrate.

According to the present invention, the object in the illustrated case the cone—is printed with an orientation such that an optical functional surface of the object faces away from the substrate (i.e. it is the first surface). An optical functional surface in this context is a surface intended to interact with light in a desired manner, and may be a surface intended to be reflective or esthetic. As will be explained below, the first surface will be smoother than the second surface. In FIG. 1a, the first surface, i.e. the smooth surface to be used as an optical functional surface, is the outside 4 of the cone. In FIG. 1b, the first surface, i.e. the smooth surface to be used as an optical functional surface, is the inside 4' of the cone.

The principles behind the different roughness of the surfaces 4, 4' and 5, 5' will be explained in more detail with reference to FIG. 2a-b.

FIG. 2a shows how the nozzle of a printer head 10 is moved around a predefined path 15, here substantially circular, while depositing a track 16 of melted filament on previously deposited layers.

When 3D printing an object having a wall surrounding a hollow interior (such as a cone, cylinder, semi-sphere, etc.) each layer of the wall may be printed in discrete movements, one at a time, or the wall may be printed with one single spiral movement of the printer head. This technique is known as a "spiralize" function, and is available in some 3D-printing software.

In portions of the wall 2 that are inclined with respect to the substrate, i.e. not normal to the substrate, the track 16 that is being printed will only be partially supported by the underlying track 17. As a consequence, the portion 16a of the currently printed track 16 that is not supported by the underlying track 17 will "sag" towards the substrate, thereby forming a sharp edge 18 extending along each track 16, 17. This is shown in more detail in FIG. 2b.

The accumulated effect of the sharp edge 18 is that the surface 5' facing the substrate (i.e. the surface where the sharp edges 18 are located) will be rougher than the opposite surface 4' facing away from the substrate 14, where the consecutive layers 16, 17 form a more regular step-pattern.

The amount of "sag", and thus the roughness of the surface, will depend on several factors, including the diameter of the nozzle 13 defining the width of the printed track 16, and the thickness of the printed track 16. In the example illustrated in FIG. 2a, it is clear that the width w of track 16 is significantly greater than the thickness d of the track 16, approximately a factor five greater. Therefore, the material (the melted filament 12) is pressed (by the nozzle 13) during printing to form the flat track 16, rather like when applying a thin layer of toothpaste on a toothbrush. In portions where there is no support to counter-act this pressure, the track will "sag" as discussed above, just like the toothpaste will be forced beyond the upper surface of the toothbrush if you apply it outside the edges of the brush.

As explained above, the smoother surface of the wall 2, i.e. the surface 4, 4' facing away from the substrate, is intended to be used as an optical functional surface. The surface may be coated with a suitable coating to create or improve the surface properties. For example, coatings may be used to improve smoothness, make the surface reflective or diffusive, or to simply paint the surface.

Figure 4A:
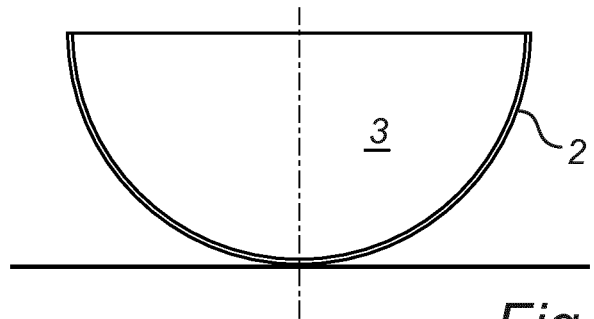
FIGS. 4a and 4b are sectional views of a second 3D object in two different orientations.
Figure 4B:
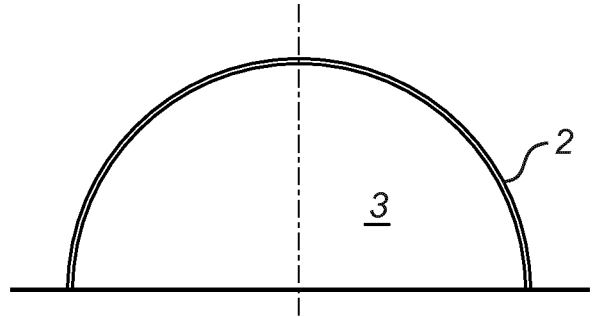
Figure 5:
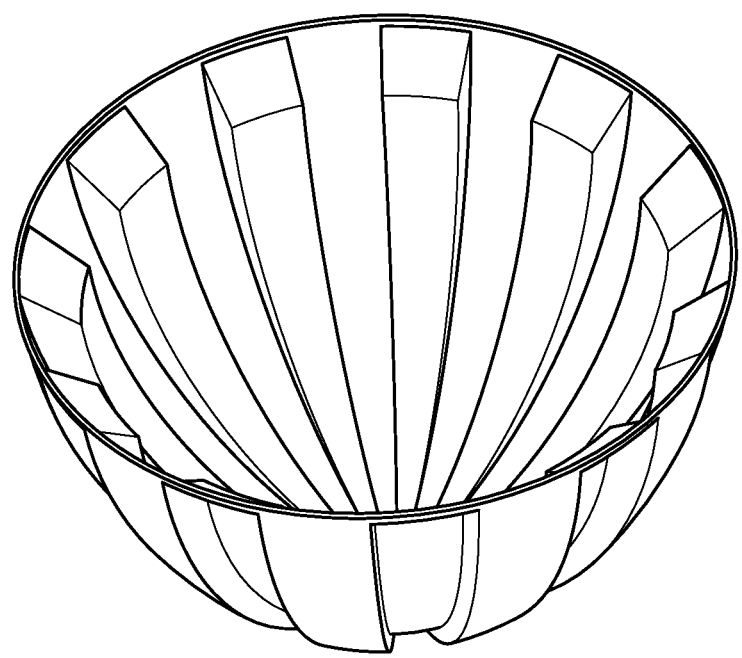
FIG. 5 is a perspective view of a third 3D object.

FIGS. 3-5 show further example of objects which advantageously may be printed using 3D printing according to the present invention. These objects are all formed by a contour wall 2 surrounding a hollow interior space 3.

Figure 3A:
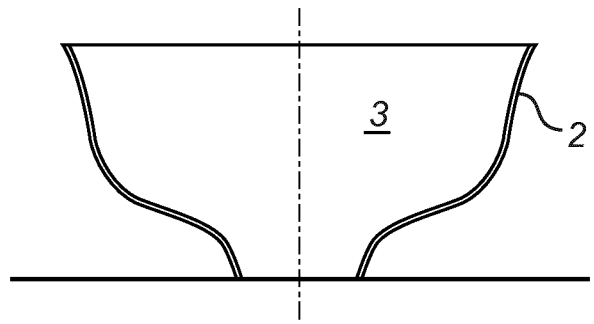
FIGS. 3a and 3b are sectional views of a first 3D object in two different orientations.
Figure 3B:
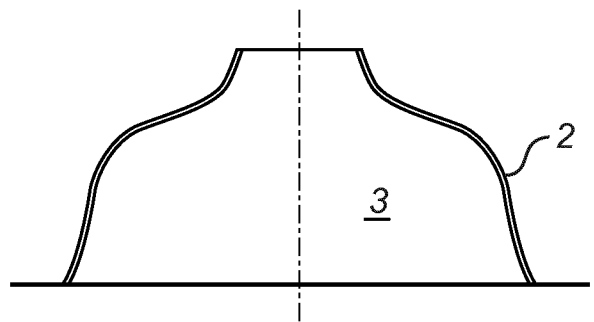

Just like the cone in FIGS. 1-2, the 3D object in FIGS. 3a-3b is rotational symmetrical. With the orientation chosen in FIG. 3a, the inside of the object is smoother than the outside, and the object may be used e.g. as a light collimator in a luminaire. In FIG. 3b the outside is smoother than the inside, and the object may be used e.g. as a lamp shade.

The 3D object in FIGS. 4a-4b is also rotational symmetrical, but contrary to the objects in FIGS. 1-3 the object in FIGS. 4a-4b is closed in one end, and has the shape of a semi-sphere. With the orientation chosen in FIG. 4a, the inside of the semi-sphere is smoother than the outside, and the semi-sphere may be used e.g. as a collimator or reflector. In FIG. 4b the outside is smoother than the inside. Such an object for example can be filled with index matching polymer to be used as lens.

Contrary to the objects in FIGS. 1-4, the object in FIG. 5 is not rotational symmetrical and it has indentations, but similar to the object in FIG. 4 it is closed in one end to form a dome shape. With the orientation chosen in FIG. 5, the inside of the dome-shaped object will be smoother than the outside, and the object may be used as a reflector/collimator.

The person skilled in the art realizes that the present invention by no means is limited to the preferred embodiments described above. On the contrary, many modifications and variations are possible within the scope of the appended claims. For example, the 3D objects illustrated herein have been chosen for their simplicity, and more complex shapes are also possible. Indeed, any 3D-printed object having a wall formed by consecutive tracks printed onto each other can be oriented during printing according to the invention to ensure that one surface of the wall is smoother than the other. Also, it is noted that the wall may comprise several facets, or portions, each having a different tangent (or tangent surface). In this case, the angle between the tangent and the normal (z-axis) may be different, resulting in different smoothness for different portions of the wall.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A method for 3D printing an object, the method comprising the steps of:
    moving a printing head along a predefined path in an x-y plane;
    extruding and depositing a track of printing material from a nozzle of said printing head during movement of the printing head along the predefined path, to print one layer of said object, the object having at least one wall forming a contour wall surrounding a hollow interior;
    printing consecutive layers onto each other, thereby forming said wall by printing one track on top of another track; and
    selecting an orientation of the object during printing by defining the predefined path of each layer such that at least a portion of said wall has a tangent non-parallel to a normal of the x-y plane;
    wherein a first surface in said portion faces the hollow interior and away from the x-y plane and a second surface in said portion faces the x-y plane and wherein the first surface has different optical properties than the second surface.

2. The method according to claim 1, wherein said object is printed on a support extending parallel to said x-y plane.

3. The method according to claim 1, wherein a ratio of a width of the printed track and a thickness of each layer is greater than three, or alternatively greater than five.

4. The method according to claim 1, wherein the predefined paths of consecutive layers form a spiral movement, to form said contour wall.

5. The method according to claim 1, wherein said printing method is an FDM printing process, and wherein said printing material is a melted thermoplastic filament.

6. The method according to claim 1, wherein said tangent forms an angle with said normal (z axis) which angle is in the range 5-45 degrees.

7. The method according to claim 1 further comprising coating said first surface with a coating having desired optical or esthetic properties.

8. The method according to claim 1, wherein the object is a light collimator and wherein the first surface is configured to serve as an optical functional surface for light collimation.

9. The method according to claim 1, wherein each track of the object has symmetry in the x-y plane that is at least one of: circular symmetry, axial symmetry, and rotational symmetry.

10. The method according to claim 1, further comprising:
    configuring the first surface of the object to serve as an optical functional surface of a lampshade; and
    diffusely reflecting light using said first surface of the lampshade.

11. The method according to claim 1, wherein the step of selecting an orientation of the object during printing includes:
    defining the predefined path of each layer such that a first portion of said wall has a tangent non-parallel to a normal of the x-y plane and a second portion of said wall has a normal that is parallel with the normal of the x-y plane.

* * * * *